United States Patent Office 2,886,543
Patented May 12, 1959

2,886,543

POLYAMIDE RESIN

Dwight E. Peerman and Harold Wittcoff, Minneapolis, Minn., assignors to General Mills, Inc., a corporation of Delaware No Drawing. Application August 17, 1954
Serial No. 450,523

5 Claims. (Cl. 260—18)

The present invention relates to a complex polyamide resin of a thermoplastic nature which is particularly useful as an adhesive or cement, particularly for bonding metals.

It is, therefore, an object of the present invention to provide a novel polyamide resin of a complex nature which is particularly suitable as an adhesive or cement.

The polyamide of the present invention is derived from four principal reactants and one optional reactant. The four principal reactants are the following:

(1) Polymeric fat acids
(2) Dibasic acids containing from 5 to 10 carbon atoms
(3) Alkylene diamines containing from 2 to 6 carbon atoms
(4) Polyalkylene polyamines containing from 3 to 5 amino groups with the alkylene groups containing from 2 to 3 carbon atoms The optional fifth ingredient is monomeric fatty acid which is used for forming end groups on the polymer and thus regulating the molecular weight.

The polymeric fat acids are a mixture of dimeric and trimeric fatty acids resulting from the polymerization of drying or semi-drying oils or from the polymerization of the free acids or simple aliphatic alcohol esters of the acids of such oils as soybean, linseed, tung, perilla, oiticica, cottonseed, corn, tall, sunflower, safflower and dehydrated castor oils. These may be polymerized by a simple thermal polymerization in which case the fatty acids of sufficient double bond functionality combine to provide a mixture of dibasic and higher polymeric acids. The acids with insufficient functionality to react remain as monomers and may be removed by distillation. Inasmuch as some monomeric fatty acid may be desirable to control molecular weight as was indicated above, the amount of monomer left in the polymeric fat acids may be regulated for this purpose. In place of thermal polymerization for the production of the polymeric fat acids, a catalytic method of polymerization such as for example the polymerization of mono or poly olefinic acids in the presence of such catalysts as ditertiary butyl peroxide may be employed. The resultant polymeric fat acids may retain residual unsaturation or may be saturated either as a result of the polymerization reaction or through hydrogenation.

The dibasic acid employed is one in which the two carboxyl groups are separated by at least 3 and not more than 8 carbon atoms. Typical of such polybasic acids are the aliphatic acids, glutaric, adipic, pimelic, suberic, azelaic, sebacic; and the aromatic acids, terephathalic and isophthalic.

The alkylene diamine employed is one in which the alkylene group contains from 2 to 6 carbon atoms. Typical of these alkylene diamines are ethylene diamine, 1,3-diamino propane, 1,3-diamino butane, 1,4-diamino butane, hexamethylene diamine, 3-isopropylamino propylamine and the like.

The polyalkylene polyamine employed is one which contains from 3 to 5 amino groups which are separated by alkylene groups containing from 2 to 3 carbon atoms. Typical of these polyalkylene polyamines are diethylene triamine, triethylene tetramine, tetraethylene pentamine, 3,3'-imino-bispropylamine and the like.

The optional component, the monomeric fat acid, may be any monomeric fat acid of from 8 to 22 carbon atoms either saturated or unsaturated.

The relative proportions of the various components are as follows, all of these being employed in the ratios indicated per equivalent of the polymeric fat acids:

| | Equivalents |
|---|---|
| Dibasic acid | 0.1 to 0.4 |
| Alkylene diamine | 0.3 to 1.5 |
| Polyalkylene polyamine | 0.2 to 1.2 |

The optional monomeric fatty acid may be used in any desired proportion to regulate the properties of the product as is well understood by those skilled in this art. The relative proportions of the components are further restricted in that from 1.2 to 2.5 total equivalents of amine are employed per equivalent of total polybasic acid. An equivalent weight of the polybasic acid is equal to the molecular weight of the acid divided by the number of carboxyl groups. The equivalent weight of the polyamines is the molecular weight of the polyamines divided by the total number of primary and secondary amino groups in the compound.

By employing non-fatty dibasic acid in the upper portion of the above range, products of high melting point and hardness may be obtained. Similarly, the hardness and plasticity of the polyamide may be increased by employing a ratio of the diamine to the polyalkylene polyamine which is within the upper portion of the range referred to above. Usually an excess of the polyalkylene polyamine is used to provide free amine groups which impart excellent adhesive properties to the polymer. The preferred polyamides are those having an amine number in the approximate range of 10–80. As used herein the "amine number" of a polyamide resin is the number of milligrams of KOH equivalent to the free amine groups in one gram of resin.

Example 1

6.10 equivalents of polymeric fat acids, 6.10 equivalents of ethylene diamine, 0.70 equivalent of unsaturated fatty acid monomer, 1.94 equivalents of sebacic acid, and 3.86 equivalents of diethylene triamine were charged into a reaction vessel equipped with a stirrer, thermometer, distillation column, and distillate removal head. The temperature was raised slowly to 200° C. and maintained at this temperature for a total of 3 hours with the mixture being agitated. During the last hour of the reaction temperature a vacuum of 12 mm. of mercury was applied to remove the last traces of the water of reaction. The polyamide had the following physical and chemical characteristics:

Softening point (ASTM ball and ring method)

| | |
|---|---|
| | °C 144.2 |
| Gel time | min 24–30 |
| Viscosity (Gardner-Holdt 25% solution in butanol:phenyl, 1:1) | B–C |
| Color (Gardner) | 11 |
| Acid number | 7.2 |
| Amine number | 35.1 |
| Hardness (ASTM penetration) | 6.4 |

The polyamide resin was an excellent adhesive for metal and other porous and non-porous surfaces. It was thermoplastic and could be applied by hot melt technique. On cooling, the adhesive instantly adhered to the surfaces to which it had been applied. The adhesive may be maintained above its melting point for long periods of time without changing its physical properties. For example, it was heated 8 hours at 200° C. without a drop in its melting point. This stability of physical characteristics makes possible the use of this adhesive in production equipment where long periods of elevated temperatures may be necessary.

*Example 2*

A polyamide resin of higher melting point and increased rigidity was prepared from 1.0 equivalent of polymeric fat acids, 1.22 equivalents of ethylene diamine, 0.287 equivalent of sebacic acid, 0.21 equivalent of diethylene triamine, and 0.073 equivalent of unsaturated fatty acid monomer. The reaction was carried out as described in the previous example to yield a polyamide resin having the following physical and chemical characteristics:

| | |
|---|---|
| Softening point ° C | 169 |
| Viscosity | B–C |
| Color | 9–10 |
| Acid number | 9.5 |
| Amine number | 20.4 |
| Penetration hardness | 2.6 |
| Gel time min | 60 |

This polyamide resin is useful where high rigidity and high melting point are advantageous.

*Example 3*

A polyamide resin of extreme flexibility was prepared from 1.0 equivalent of polymeric fat acids, 0.47 equivalent of ethylene diamine, 0.13 equivalent of sebacic acid, 1.06 equivalents of diethylene triamine and 0.05 equivalent of monomeric fatty acid. The reaction was carried out as described in Example 1, the yield of polyamide resin having the following physical and chemical characteristics:

| | |
|---|---|
| Softening point ° C | 61 |
| Viscosity | B–C |
| Gel time min | 20 |
| Color | 10–11 |
| Acid number | 7.3 |
| Amine number | 63.0 |

This polyamide can advantageously be used as a cement of excellent flexibility, low temperature resistance and desirable flow characteristics.

While in the examples a temperature of approximately 200° C. was employed, it is possible to vary this temperature considerably, for example, within the range of 180 to 300° C. The time periods will, of course, vary with the particular temperature, the higher temperatures requiring shorter periods of time. The particular temperature employed is one which is suitable for the formation of the polyamide but below that at which the individual reactants or the products decompose. Similarly the particular point at which the vacuum is applied and the degree of vacuum applied may be varied as is well understood by those skilled in the art.

Now, therefore, we claim:

1. A polyamide resin comprising the reaction product of the following reactants employed in the proportions indicated: (a) one equivalent of polymeric fat acids, (b) 0.1 to 0.4 equivalent of a saturated dicarboxylic acid containing from 5 to 10 carbon atoms, (c) 0.3 to 1.5 equivalents of an alkylene diamine containing from 2 to 6 carbon atoms, (d) 0.2 to 1.2 equivalents of a polyalkylene polyamine containing from 3 to 5 amino groups selected from the group consisting of primary and secondary amino groups and in which the alkylene groups contain from 2 to 3 carbon atoms, the total equivalents of amine per equivalent of polybasic acid beting within the range of 1.2 to 2.5.

2. A polyamide resin comprising the reaction product of the following components employed in the relative proportions indicated: (a) 6.10 equivalents of polymeric fat acids, (b) 1.94 equivalents of sebacic acid, (c) 6.10 equivalents of ethylene diamine, (d) 3.86 equivalents of diethylene triamine, and (e) 0.70 equivalent of a fatty acid containing from 8 to 22 carbon atoms.

3. A polyamide resin comprising the reaction product of the following components employed in the relative proportions indicated: (a) 1.0 equivalent of polymeric fat acids, (b) 0.287 equivalent of sebacic acid, (c) 1.22 equivalents of ethylene diamine, (d) 0.21 equivalent of diethylene triamine, and (e) 0.073 equivalent of fatty acid conating from 8 to 22 carbon atoms.

4. A polyamide resin comprising the reaction product of the following components employed in the relative proportions indicated: (a) 1.0 equivalent of polymeric fat acids, (b) 0.13 equivalent of sebacic acid, (c) 0.47 equivalent of ethylene diamine, (d) 1.06 equivalents of diethylene triamine, and (e) 0.05 equivalent of unsaturated vegetable acids.

5. A polyamide resin comprising the reaction product of the following reactants employed in approximately the percentages indicated: (a) 1.0 equivalent of polymeric fat acid, (b) 0.1 to 0.4 equivalent of sebacic acid, (c) 0.3 to 1.5 equivalents of ethylene diamine, (d) 0.2 to 1.2 equivalents of diethylene triamine, the total equivalents of amine per equivalent of polybasic acid being within the range of 1.2 to 2.5.

References Cited in the file of this patent

UNITED STATES PATENTS

| | | |
|---|---|---|
| 2,149,273 | Carothers | Mar. 7, 1939 |
| 2,450,940 | Cowan | Oct. 12, 1948 |
| 2,695,908 | Wittcoff et al. | Nov. 30, 1954 |
| 2,705,223 | Renfrew et al. | Mar. 29, 1955 |

OTHER REFERENCES

Cowan et al.: Oil and Soap, 21, pages 101–107 (1944).